US009786266B2

(12) United States Patent
Laugharn, Jr. et al.

(10) Patent No.: US 9,786,266 B2
(45) Date of Patent: Oct. 10, 2017

(54) METHOD AND SYSTEM FOR ACOUSTICALLY TREATING MATERIAL

(71) Applicant: Covaris, Inc., Woburn, MA (US)

(72) Inventors: James A. Laugharn, Jr., Winchester, MA (US); Xiaoyin He, Waltham, MA (US)

(73) Assignee: Covaris, Inc., Woburn, MA (US)

( * ) Notice: Subject to any disclaimer, the term of this patent is extended or adjusted under 35 U.S.C. 154(b) by 545 days.

(21) Appl. No.: 14/101,855

(22) Filed: Dec. 10, 2013

(65) Prior Publication Data

US 2015/0161982 A1 Jun. 11, 2015

(51) Int. Cl.
*G10K 11/00* (2006.01)
*G10K 11/28* (2006.01)
*B01J 19/10* (2006.01)

(52) U.S. Cl.
CPC ............... *G10K 11/28* (2013.01); *B01J 19/10* (2013.01)

(58) Field of Classification Search
CPC .................................. G10K 11/26; G10K 11/00
See application file for complete search history.

(56) References Cited

U.S. PATENT DOCUMENTS

| | | | | |
|---|---|---|---|---|
| 5,241,287 A * | 8/1993 | Jen | ........................ | G10K 11/24 333/143 |
| 6,016,351 A * | 1/2000 | Raida | ...................... | G10K 7/02 381/77 |
| 6,613,005 B1 * | 9/2003 | Friedman | ................. | A61N 7/02 600/371 |
| 6,719,449 B1 | 4/2004 | Laugharn et al. | | |
| 6,948,843 B2 | 9/2005 | Laugharn et al. | | |
| 7,521,023 B2 | 4/2009 | Laugharn et al. | | |
| 8,459,121 B2 | 6/2013 | Laugharn et al. | | |
| 2002/0009015 A1 * | 1/2002 | Laugharn, Jr. | ......... | G10K 15/00 366/108 |
| 2002/0179731 A1 * | 12/2002 | Jameson | ................ | F23D 11/34 239/102.2 |
| 2003/0060736 A1 | 3/2003 | Martin et al. | | |
| 2003/0098364 A1 | 5/2003 | Jameson | | |
| 2006/0144871 A1 * | 7/2006 | Van Tuyl | ............. | G01N 29/024 222/420 |
| 2006/0184072 A1 * | 8/2006 | Manna | ..................... | A61N 7/02 601/2 |
| 2010/0011845 A1 | 1/2010 | Laugharn et al. | | |
| 2012/0234625 A1 | 9/2012 | Laugharn et al. | | |

OTHER PUBLICATIONS

International Search Report and Written Opinion dated Feb. 23, 2015 from corresponding PCT Application No. PCT/US2014/069550.

* cited by examiner

*Primary Examiner* — Isam Alsomiri
*Assistant Examiner* — Hovhannes Baghdasaryan
(74) *Attorney, Agent, or Firm* — Wolf, Greenfield & Sacks, P.C.

(57) ABSTRACT

Methods and systems for acoustically treating material are described. Acoustic energy is emitted into a waveguide having a wall with a shape that tapers away from the acoustic source. The wall may have a substantially conical or parabolic shape. When emitted therein, the waveguide causes convergence of the acoustic energy so as to form an acoustic focal zone at a vessel. In some embodiments, a substantial portion of the acoustic focal zone is located outside of the internal volume defined by the waveguide.

24 Claims, 7 Drawing Sheets

METHOD AND SYSTEM FOR ACOUSTICALLY TREATING MATERIAL

BACKGROUND

1. Field of Invention

Systems and methods of acoustic processing are generally disclosed.

2. Related Art

Ultrasonics have been utilized for a variety of diagnostic, therapeutic, and research purposes. The acoustic physics of ultrasonics is well understood; however, the biophysical, chemical, and mechanical effects are generally only empirically understood. Some uses of sonic or acoustic energy in materials processing include "sonication," an unrefined process of mechanical disruption involving the direct immersion of an acoustic source emitting unfocused energy in the kilohertz ("kHz") range into a fluid suspension of the material being treated. Such sonic energy often does not reach a target in an effective dose because the energy is scattered, absorbed, and/or not properly aligned with the target. Sonication has also hit limits on effectiveness when applied to higher sample volumes or continuous process streams. There are also specific clinical examples of the utilization of therapeutic ultrasound (e.g., lithotripsy) and of diagnostic ultrasound (e.g., fetal imaging). However, ultrasonics have generally not been controlled in a manner so as to provide automated, broad range, precise materials processing or reaction control mechanisms.

In U.S. Pat. Nos. 6,719,449; 6,948,843; 7,521,023; and 8,459,121, assigned to Covaris of Woburn, Mass., aspects of which may be incorporated in systems described herein, the use of "focused acoustical energy" is described to overcome some of the limitations of traditional "sonication." Focusing the acoustical energy has many advantages, and can be effective at processing high sample volumes or continuous process streams through the use of a "processing chamber" through which the sample material passes. In past focused acoustic systems, the acoustic transducer would be specially machined to have a concave surface from which, upon operation, a focal zone of acoustic energy is formed.

SUMMARY

The inventors have recognized and appreciated that it would be advantageous, within the context of an acoustic treatment system, to direct acoustic energy into a space defined by a waveguide chamber, which appropriately channels the acoustic energy so as to create a focal zone of acoustic energy. Accordingly, rather than having to use a specially machined transducer to produce focused acoustic energy having desirable characteristics, aspects described herein provide for a transducer that emits relatively flat, divergent, or otherwise non-convergent, acoustic waves to be used in cooperation with an appropriately structured waveguide, so as to form a suitable focal zone of acoustic energy. This focal zone of acoustic energy may be used to process sample material contained within a vessel in a suitable manner.

As discussed, initially unfocused or non-convergent acoustic energy may be emitted into an internal space defined by a waveguide so as to subsequently be formed into a suitable focal zone of acoustic energy. The waveguide may have an inner wall that defines a tapered internal volume. While the inner wall may have any suitable shape, a parabolically shaped inner wall, tapered away from the acoustic source, may give rise to particularly advantageous results, causing convergence of the acoustic energy, forming a suitable acoustic focal zone.

The transducer may emit acoustic energy having a frequency between about 100 kHz and about 100 MHz, more preferably between 500 kHz to 10 MHz, into a waveguide and toward a vessel. The emitted acoustic energy may then be manipulated by such a waveguide to form a focal zone of acoustic energy located within a processing zone, for example, measuring approximately 10 mm to 20 mm across (and possibly of larger size with increases in energy). The processing zone may be at least partially within the vessel; for example, sample material may pass through this zone, or remain within this zone for a suitable period of time, to achieve a desired effect.

In some embodiments of the present disclosure, samples are treated with ultrasonic energy the temperature of the sample is controlled, by use of computer-generated complex wave trains, which may further be controlled by the use of feedback from a sensor. The acoustic output signal, or wave train, can vary in any or all of frequency, intensity, duty cycle, burst pattern, and pulse shape. Moreover, this treatment can be undertaken automatically under computer control, and can also be linked to instrumentation and measurement feedback from the bulk or output stream. In another example, some embodiments of the present disclosure can treat samples with ultrasonic energy by relative movement of the sample and the focus of the beam, in any or all of two or three dimensions, to ensure complete and thorough mixing within the processing zone.

In an illustrative embodiment, a system for providing acoustic treatment is provided. The system includes an acoustic energy source configured to emit acoustic energy having a frequency of about 100 kHz to 100 MHz toward a vessel location; and a waveguide including a wall having a parabolic shape constructed and arranged to manipulate the acoustic energy to form a focal zone of acoustic energy at the vessel location to expose a sample in a vessel at the vessel location.

In another illustrative embodiment, a method of acoustic energy treatment is provided. The method includes emitting acoustic energy having a frequency of about 100 kHz to 100 MHz from an acoustic energy source toward a vessel; and manipulating the emitted acoustic energy by a waveguide including a wall having a parabolic shape to form a focal zone of acoustic energy located at least partially within the vessel.

Other advantages and novel features of the invention will become apparent from the following detailed description of various non-limiting embodiments when considered in conjunction with the accompanying figures and claims.

BRIEF DESCRIPTION OF THE DRAWINGS

Aspects of the invention are described with reference to the following drawings in which numerals reference like elements, and wherein.

DETAILED DESCRIPTION

Figure 1:
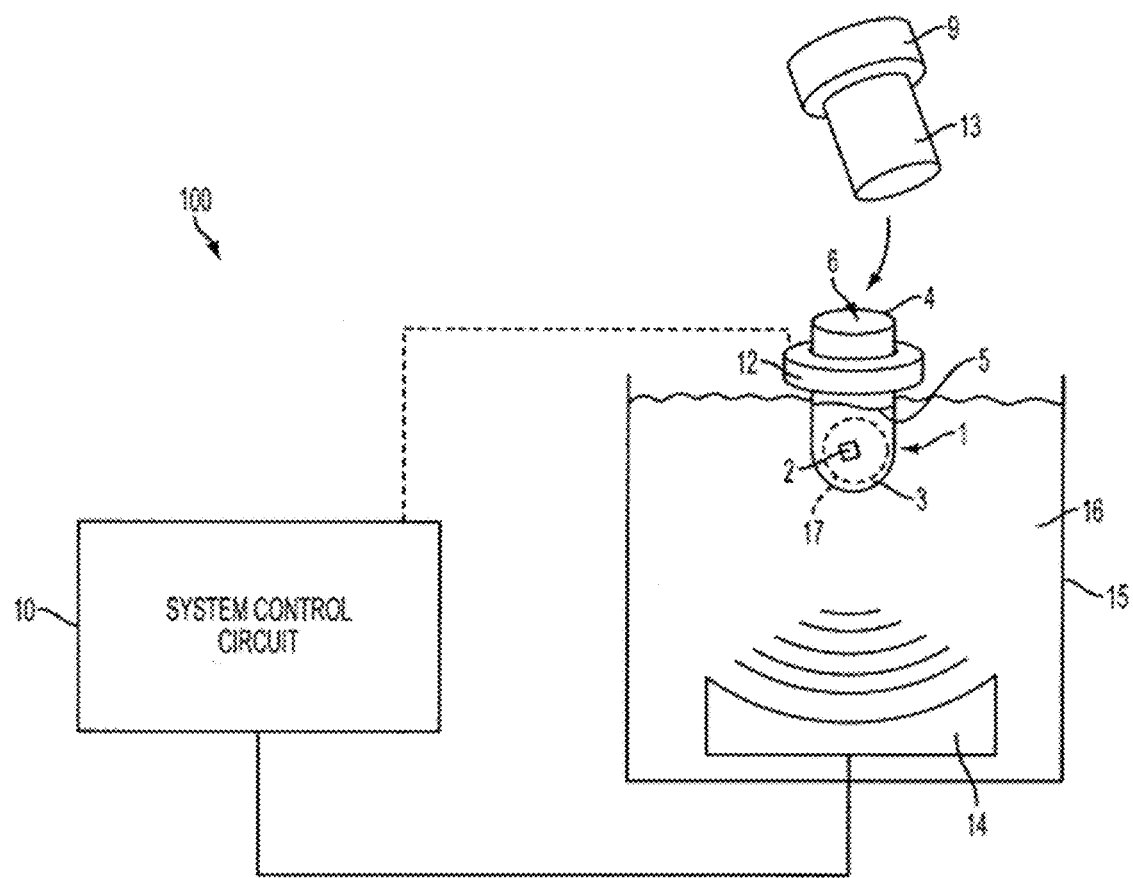
FIG. 1 shows a schematic block diagram of an acoustic treatment apparatus.

"Sonic energy" as used herein is intended to encompass such terms as acoustic energy, acoustic waves, acoustic pulses, ultrasonic energy, ultrasonic waves, ultrasound, shock waves, sound energy, sound waves, sonic pulses, pulses, waves, or any other grammatical form of these terms, as well as any other type of energy that has similar characteristics to sonic energy.

"Focal zone" or "focal point" as used herein means an area where sonic energy converges and/or impinges on a target, although that area of convergence is not necessarily a single focused point, but may include a volume of varying size and shape.

As used herein, the terms "process chamber" or "processing zone" refer to a vessel or region where the sonic energy converges, and the sample material is present for treatment.

As used herein, "nonlinear acoustics" can refer to a lack of proportionality between input and output. For example, as the amplitude applied to the acoustic transducer increases, the sinusoidal output loses proportionality such that eventually the peak positive pressure increases at a higher rate than the peak negative pressure. Also, water becomes nonlinear at high acoustic energy intensities, and in a converging acoustic field, the waves become more disturbed as the intensity increases toward the focal point. Nonlinear acoustic properties of tissue can be useful in diagnostic and therapeutic applications.

As used herein, "acoustic streaming" can refer to generation of fluid flow by acoustic waves. The effect can be non-linear. Bulk fluid flow of a liquid in the direction of the sound field can be created as a result of momentum absorbed from the acoustic field.

As used herein, "acoustic micro-streaming" can refer to time-independent circulation that occurs only in a small region of the fluid around a source or obstacle, for example, an acoustically driven bubble in a sound field.

As used herein, "acoustic absorption" can refer to a characteristic of a material relating to the material's ability to convert acoustic energy into thermal energy.

As used herein, "acoustic impedance" can refer to a ratio of sound pressure on a surface to sound flux through the surface, the ratio having a reactance and a resistance component.

As used herein, "acoustic window" can refer to a system or device for allowing sonic energy to pass through to the sample within the processing chamber or zone.

As used herein, "acoustic lens" can refer to a system or device for spreading, converging or otherwise directing sounds waves.

As used herein, "acoustic scattering" can refer to irregular and multi-directional reflection and diffraction of sound waves produced by multiple reflecting surfaces, the dimensions of which are small compared to the wavelength, or by certain discontinuities in the medium through which the wave is propagated.

As discussed above, in more traditional focused acoustic systems, the acoustic transducer typically has a curved surface that is able to emit an acoustic energy wave that automatically converges into a suitable focal zone. Though, manufacture of such shaped acoustic transducers can be costly. Also, such pre-made acoustic transducers might not be versatile so as to allow for different types of shaping of the focused acoustic wave itself.

The inventors have recognized and appreciated that it would be advantageous, for an acoustic treatment system, to direct acoustic energy into a space defined by a waveguide structure, which then appropriately channels the acoustic energy so as to create a desired focal zone of acoustic energy.

Accordingly, rather than using a specially machined acoustic transducer to produce focused acoustic energy having predetermined characteristics, aspects described herein allow for the use of an acoustic transducer than emits an unfocused or otherwise non-convergent acoustic wave (e.g., generated from an acoustic transducer having a relatively flat surface from which acoustic energy is emitted) in cooperation with a waveguide to form a suitable focal zone of acoustic energy. As discussed above, the waveguide may have an inner wall defining an internal volume of a suitable shape. In some embodiments, the inner wall has a tapered shape that is parabolic, elliptical or otherwise curved such that acoustic energy which impinges against the wall is re-directed or otherwise reflected in a manner so as to form a suitable focal zone of acoustic energy used for sample treatment.

FIG. 1 shows a schematic block diagram of an acoustic treatment system 100 that incorporates various features that may be used with one or more aspects of the present disclosure. It should be understood that although embodiments described herein may include some or all aspects of the present disclosure, aspects of the present disclosure may be used alone or in any suitable combination with other aspects described herein. It can be appreciated that while certain aspects of the acoustic treatment system illustrated in FIG. 1 may be used in existing acoustic treatment systems, features depicted and described with respect to FIG. 1 may be employed along with novel and inventive aspects of the present disclosure.

FIG. 1 illustrates an acoustic treatment system 100 that includes an acoustic transducer 14 (e.g., including one or more piezoelectric elements) that is capable of generating an acoustic field (e.g., converging at a focal zone 17) suitable to cause mixing, vibration and/or other effects in a sample 1 (including a liquid 3 and a solid 2) held by a sample holder 4. While the sample holder 4 is shown in this embodiment to be a vessel (e.g., test tube, vial) that contains the sample 1, it can be appreciated that other sample holders and/or substrates may be used to hold, contain or otherwise support the sample 1, as described further below.

The acoustic transducer 14 may produce acoustic energy within a frequency range of between about 100 kilohertz and about 100 megahertz such that the focal zone 17 has a width of about 2 centimeters or less. When formed, the focal zone 17 of the acoustic energy may be any suitable shape, such as spherical, ellipsoidal, rod-shaped, line-shaped, cigar-shaped, or column-shaped, for example, and may be positioned at least partially where the sample 1 is located. For instance, the transducer may have a curvature (e.g., dome, hemispherical, cylindrical, semi-cylindrical), or may otherwise be shaped or positioned in conjunction with a focusing element (e.g., lens, acoustic filter, waveguide) that causes the formation of a particular pattern or shape of acoustic energy.

In accordance with aspects of the present disclosure, it can be appreciated that the acoustic transducer is not required to exhibit a particular curvature or shape for a suitable focal zone of acoustic energy to be formed. As discussed herein, in some embodiments, the acoustic transducer may be suitably positioned such that acoustic energy emitted therefrom enters into an internal volume of a waveguide that reflects or otherwise directs the acoustic energy in a manner that results in the formation of a suitable acoustic focal zone. Accordingly, in some embodiments, the acoustic transducer 14 may be configured to emit unfocused, non-convergent acoustic energy, and the focal zone may be defined by the structure of the waveguide.

It should be appreciated that the transducer may be arranged in any suitable manner so as to create a focused, partially-focused or unfocused wavetrain, and the waveguide may be configured, together with the transducer, to form a suitable focal zone. For example, the transducer may produce a wavetrain having any suitable shape, and the waveguide may operate on the acoustic energy emitted therefrom to form a desired focal zone where sample material is at least partially located. In some embodiments, the transducer may have a flat or curved shape from which acoustic energy may be generated. In some embodiments, the acoustic source may be provided as a plurality of transducers that are arranged in a suitable configuration so as to generate a desired acoustic wavetrain. For example, a phased array of suitably shaped transducers may be able to produce a variety of different wavetrains, resulting in focused, partially-focused or unfocused acoustic energy. Such an array may involve a number of relatively small transducers placed at appropriate locations, where each of transducers may be pulsed independently according to a patterned sequence that results in an acoustic beam with controlled characteristics.

In some embodiments, the transducer 14 may be formed of a piezoelectric material, such as a piezoelectric ceramic. The focal zone 17 may be larger than the sample, or may be smaller than the sample, as shown in FIG. 1, e.g., the focal zone 17 may fit entirely within the sample holder 4. U.S. Pat. Nos. 6,719,449; 6,948,843; 7,521,023; and 8,459,121 are incorporated by reference herein for details regarding the construction and operation of an acoustic transducer and its control.

The sample holder 4 may have any suitable shape, size, material, or other arrangement/feature. While the sample holder is depicted as an enclosable container (e.g., glass tube, plastic container, well in a microtiter plate, plastic vial, vessel, 6×16 mm glass or plastic tube (approximately 150 microliter volume) having a screw cap, etc.) that may be supported at a location by a holder support 12, it can be appreciated that certain types of sample holders other than that shown may be used. For example, the sample holder 4 may be a cylindrical tube with a flat bottom and a threaded top end to receive a cap 9, may include a cylindrical collar with a depending flexible bag-like portion to hold a sample, may be a single well in a multiwell plate, may be a microscope slide, may be a cube-shaped sample holder, and/or may be of any other suitable arrangement. In some embodiments, the sample holder is a tube equivalent, or similar, to the microTUBE vessel, provided by Covaris, Inc.

The illustrative embodiment of FIG. 1 further shows the sample 1 to include a solid material 2, such as a tissue sample that has been formalin fixed and paraffin embedded (i.e., an FFPE sample) that is contained in a sample holder 4 along with a liquid 3, e.g., a non-solvent aqueous solution. The liquid 3 may be a mixture of water and detergent (e.g., 0.25% sodium dodecyl sulfate solution), although other solutions (solvent or non-solvent) are possible, or in some cases no solution at all may be present.

The sample may have any suitable volume and/or mass, e.g., the sample may be a so-called "scroll," "core" or piece of FFPE tissue microtome sliced from a larger sample piece, a tissue sample taken by needle biopsy, or a sample produced by any other suitable method. In some embodiments, the sample includes nucleic acid molecules which may be suitably processed using embodiments of the present disclosure, for further analysis.

In some cases, care may be taken to define a headspace 6 (shown to be a gaseous region immediately above the air-liquid interface 5) in the sample holder 4 prior to acoustic treatment. Accordingly, the cap 9 may include a lower portion, or extension 13, that reaches down into the space defined by the vessel.

In this illustrative embodiment, as discussed, the sample holder 4 may be associated with a holder support 12 (e.g., molded integrally, attached, welded, or removably attached) that helps support the holder 4 during acoustic treatment. The holder support 12 may take any suitable arrangement or location, such as a ring-shaped element that is fixed relative to the vessel, as shown in FIG. 1. While embodiments described herein do not necessarily require a holder support 12, such a holder support 12 may serve to interface with the acoustic processing device so that the sample holder 4 and the sample itself may be positioned at a known location for processing/analysis, and relative to an acoustic field.

The holder support 12 is not limited to a device like that shown in FIG. 1, and may be constructed in a manner such that the holder 4 does not enclose a space. It can be appreciated that a holder support may function as a support for any suitable substrate. Holder supports may serve to appropriately position other types of sample holders and may include a rack, slot, tray, gripper element, platform, recessed area, clamp, box or any other suitable arrangement for holding and/or moving a sample holder and/or substrate with respect to a focal zone 17 and/or a microscope apparatus.

The acoustic treatment system 100 may also include a coupling medium container 15 that is capable of holding a medium 16, such as water or another liquid, gas (e.g., air, inert gas), gel (e.g., silicone), solid (e.g., elastomeric material), semi-solid, and/or a combination of such components, which transmits acoustic energy from the transducer 14 to the sample holder 4. While FIG. 1 depicts a container 15 as a basin in which coupling medium is provided, containers in accordance with the present disclosure may include, or may otherwise contain, walls that define an internal volume which may also serve to cause convergence of acoustic energy impinged thereon.

In embodiments where the medium 16 includes a solid or semi-solid, or is otherwise able to retain its shape, a container 15 need not be provided, or a portion of the medium 16 itself may function as a container 15, e.g., to hold a liquid or gas portion of the medium 16. For example, in one embodiment, the transducer 14 may be attached to a solid coupling medium 16 (such as a silica or silicone material), which is also attached to a holder support 12, which may be formed, at least in part, by an opening or other feature of the medium 16. Thus, the transducer 14, medium 16 and holder support 12 may be formed as a single integrated part, if desired. In some embodiments, walls that define an internal volume through which acoustic energy is transmitted may contain or otherwise surround the medium 16.

Due to the isothermal nature of the focused acoustic treatment, during acoustic processing, the temperature of the coupling medium may be maintained, without substantial fluctuation, as opposed to temperature changes that may otherwise occur from other methods of sample transfer. In some embodiments, the temperature of the coupling medium is maintained at a relatively low temperature, e.g., 20-60 degrees C., although thermal control at lower or higher temperatures are also possible. Accordingly, during focused acoustic treatment, in keeping with the temperature of the coupling medium being maintained to be relatively constant, the portion of the sample that is acoustically treated, or the entire sample itself, may also be maintained at a relatively low temperature, e.g., does not exceed a temperature of 20-60 degrees C.

In some embodiments, appropriate parameters of the acoustic treatment system may be controlled, such as certain characteristics of the acoustic field and/or the relative position of the acoustic transducer 14 and the sample (e.g., by moving the transducer and/or the sample holder). Accordingly, during acoustic processing, the sample may be positioned at a desired location relative to an appropriate focal zone 17. The transducer 14 may produce the acoustic energy that is caused to form a focal zone having a particular size and shape, where the focal zone is suitably positioned relative to the sample.

To control the acoustic transducer 14, the acoustic treatment system 100 may include a system control circuit 10 that controls various functions of the system 100 including operation of the acoustic transducer 14, positioning of the sample holder (and sample). The system control circuit 10 may provide control signals to a load current control circuit, which controls a load current in a winding of a transformer. Based on the load current, the transformer may output a drive signal to a matching network, which is coupled to the acoustic transducer 14 and provides suitable signal(s) for the transducer 14 to produce desired acoustic energy.

As discussed in more detail below, the system control circuit 10 may control various other functions of the acoustic treatment system 100, such as relative positioning of a sample holder 4 and/or acoustic transducer 14. For instance, the figures show a dashed line linking the control circuit 10 to the holder support 12, schematically representing an optional positioning system, e.g., which may include a robot, gantry, screw drive, or other arrangement to move the holder support 12. The system control circuit 10 may be configured to receive operator input, such as commands for system operation, or automatically provide input. The system control circuit 10 may output appropriate information in a suitable manner (e.g., to a visible display screen, as indicator lights, etc.). Such information may include sample treatment status information in electronic data form, suggestions/recommendations for applying further acoustic treatment, or other information that may be made available.

According to some embodiments of the system, sample processing control includes a feedback loop for regulating at least one of sonic energy location, pulse pattern, pulse intensity, duration, and absorbed dose of the ultrasound to achieve the desired result of acoustic treatment. In one embodiment, the ultrasonic energy is in the megahertz (MHz) frequency range, in contrast to classical sonic processing which typically employs ultrasonic energy in the kilohertz (kHz) frequency range.

As discussed herein, an acoustic wave may be emitted into the internal volume of a waveguide so as to form a focal zone of acoustic energy at the location of the sample. In some arrangements, the internal volume may be suitably sized, shaped or otherwise arranged to enhance exposure of material located at least partially within the internal volume to the acoustic energy. For example, the walls of the internal volume may cause the focal zone of acoustic energy to be formed and maintained at a location where the sample is positioned. In other arrangements, the internal volume may include elements that provide nucleation points for cavitation or other acoustically-caused effects.

In some embodiments, a coupling medium, which may be liquid, solid, semi-solid, or a mixture thereof, may be arranged to transmit acoustic energy from the acoustic energy source to a window disposed between the acoustic energy source and the sample. For example, a water bath may be positioned between the acoustic energy source and the window of the waveguide or chamber. In some arrangements, the chamber may be partially or completely submerged in a liquid coupling medium, such as water.

The internal volume may be sized and shaped as appropriate for the sample material to be treated, e.g., some acoustic treatment applications (such as sterilization) may function more effectively if a relatively small volume of material is treated within a relatively small volume, whereas other applications (such as mixing) may produce better results using a larger volume for the internal volume. The internal volume can have different shapes or other configuration characteristics, e.g., the internal volume may be defined by vertical walls, can have a conical shape (e.g., symmetric about a longitudinal axis), can have a curved shape, and so on. Also, the waveguide, comprising a chamber, can be made of multiple components such as one or more upper members, lower acoustically transparent member(s), and a body which together define the internal volume that contains the material to be treated. Alternatively, the waveguide may be made as a single unitary piece or in other ways.

Figure 2:
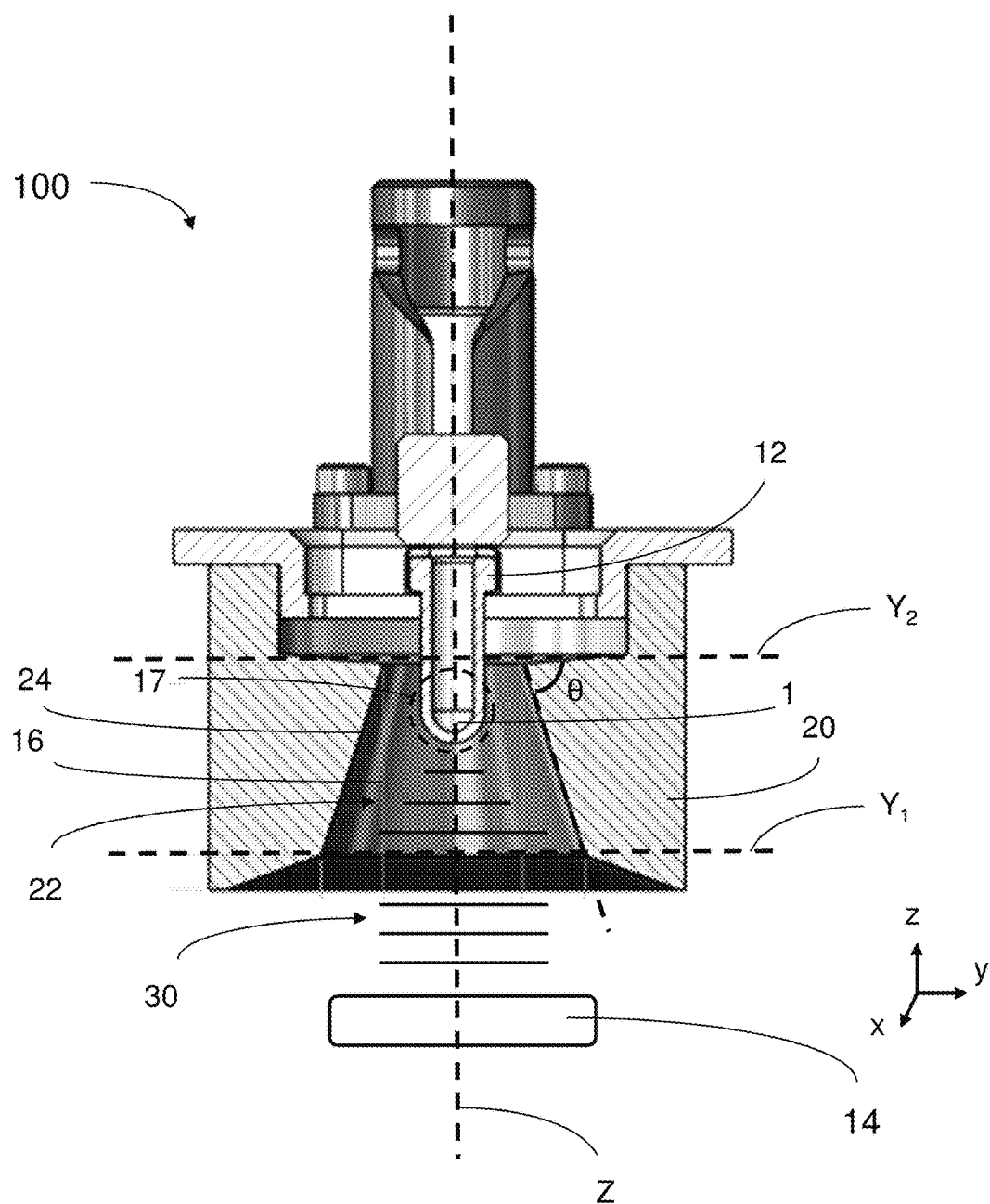
FIG. 2 depicts a cross-sectional view of an acoustic treatment apparatus.
Figure 3:
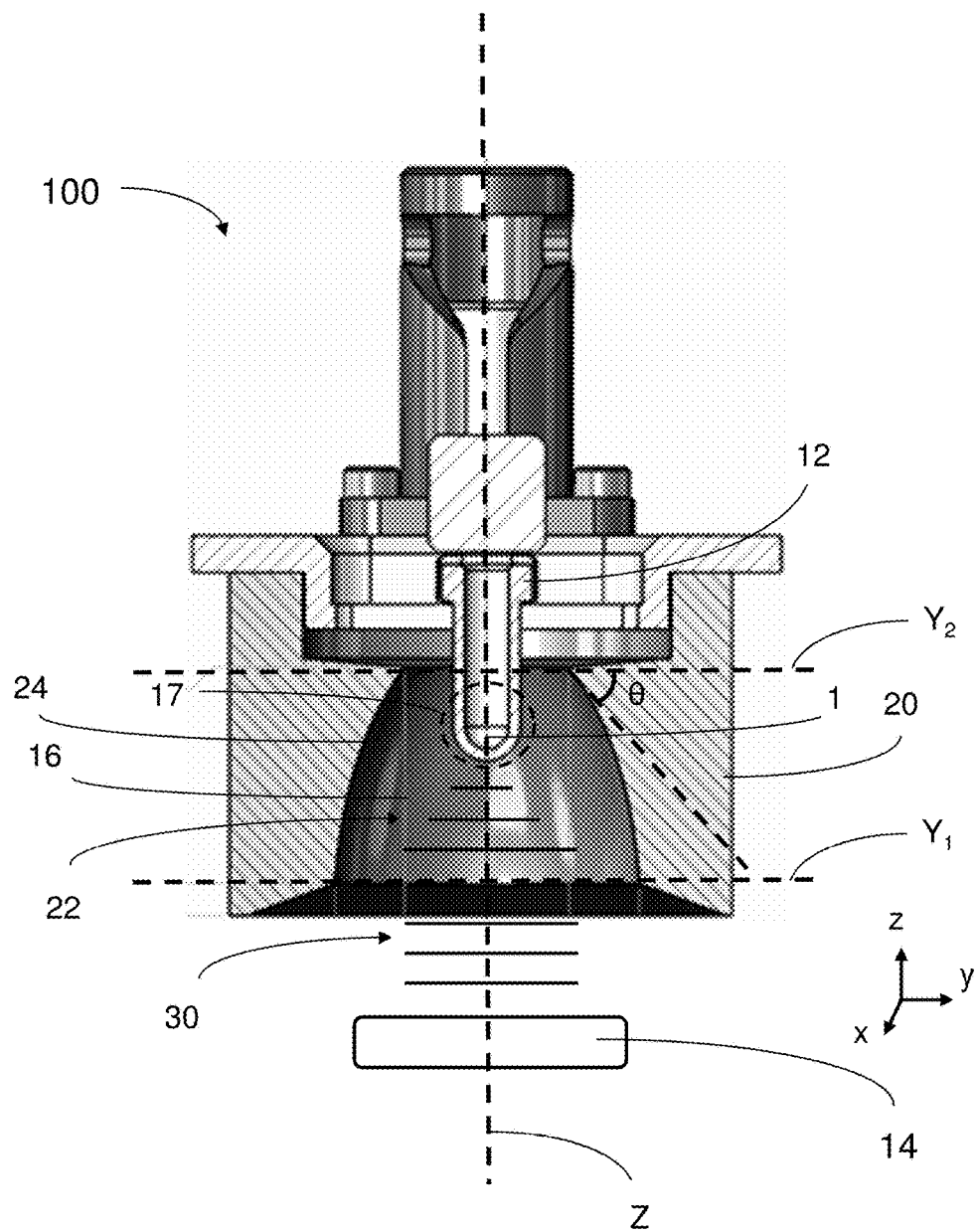
FIG. 3 illustrates a cross-sectional view of another acoustic treatment apparatus in accordance with some embodiments.

FIGS. 2 and 3 illustrate embodiments of an acoustic treatment system 100 that each includes a waveguide 20 constructed as a chamber having an internal volume 22 defined by a wall 24. The internal volume 22 has two ends disposed along an axis Z and located opposite one another, one of the ends, during use, being closer to an acoustic energy source 14 and the other end being closer to the sample 1.

As shown in FIGS. 2 and 3, the wall 24 may be constructed such that the shape of the internal volume tapers from the end of the internal volume closer to the acoustic transducer toward the end of the internal volume closer to the sample. That is, the cross-sectional area of the internal volume defined by the waveguide at a location closer to the acoustic transducer may be larger than the cross-sectional area at a location further away from the acoustic energy source, for example, at or near the sample.

Accordingly, acoustic energy transmitted from the acoustic transducer 14 through the internal volume 22 of the waveguide may be appropriately manipulated or otherwise contained by the walls so as to form a suitable focal zone 17 of acoustic energy at or near the sample 1 to be treated. Though, it can be appreciated that, in some embodiments, the cross-sectional area of the internal volume of the waveguide at some locations closer to the acoustic transducer may be smaller than the cross-sectional area at certain locations further away from the acoustic energy source, for example, due to walls of the waveguide exhibiting an irregular shape.

As described above, in some embodiments, such as that shown in FIG. 1, the acoustic transducer may be shaped or otherwise configured so as to be able to form a suitable focal zone of acoustic energy without assistance from a focusing element. Though, for other embodiments, it may be preferred to employ a focusing element for use along with the acoustic transducer. For example, as shown in FIGS. 2-3, the acoustic transducer 14 may have a substantially flat surface (or surface having a different shape) from which relatively non-convergent acoustic energy 30 is emitted. In other words, absent an acoustic lens or wall that directs acoustic energy into a focal zone having particular dimensions, acoustic waves emitted from an acoustic transducer having such a surface would not converge into a desirable focal zone of acoustic energy. Accordingly, the wall of the waveguide upon which the acoustic energy impinges may be acoustically reflective, shaped and/or may otherwise have characteristics that alters the shape and direction of the emitted acoustic energy so as to form the focal zone of acoustic energy.

Referring to FIG. 2, the wall 24 is conically shaped symmetrically about an axis Z, tapering linearly from a region near the entrance of the waveguide, where acoustic energy generated from the transducer enters, defined by an axis $Y_1$, toward an opposite end of the waveguide, where the sample holder is located, defined by an axis $Y_2$. As shown in the cross-sectional view through the waveguide in FIG. 2, the angle θ the wall makes with axis $Y_2$ is substantially constant along the length of the waveguide. Thus, the acoustic energy emitted into the internal volume 22 of the waveguide 20 is channeled from the entrance of the waveguide toward the sample 1 resulting in a focal zone of acoustic energy that is contained by the internal wall of the waveguide and comparatively smaller in size than if the waveguide were not present.

Turning now to FIG. 3, the wall 24 of the waveguide 20 has a shape that is symmetrical about an axis Z and tapered so as to exhibit a parabolic shape from a region near the entrance of the waveguide, defined by an axis $Y_1$, toward the opposite end of the waveguide, defined by an axis $Y_2$.

As shown in the cross-sectional view through the waveguide in FIG. 3, the angle θ the wall makes with the axis $Y_2$ is less than the angle the wall makes with the axis $Y_1$. As shown, the surface of the wall conforms to a shape defined by a quadratic function from the axis $Y_2$ to the axis $Y_1$, along the length of the waveguide. As such, moving from the axis $Y_2$ to the axis $Y_1$, along the length of the waveguide, the angle θ is shown to gradually increase with the curvature of the wall.

Similar to the embodiment of FIG. 2, the acoustic energy emitted into the internal volume 22 of the waveguide 20 is channeled and manipulated from the entrance of the waveguide toward the sample resulting in a focal zone of acoustic energy that is, in some cases, contained by the internal wall of the waveguide and comparatively smaller in size than if the waveguide were not present. However, in this embodiment, and in contrast with the embodiment of FIG. 2, the wall of the waveguide at a location closer to the acoustic energy source (e.g., entrance) forms an angle with the horizontal y-axis that is greater than the angle formed at a location of the wall closer to the sample holder (e.g., exit).

It can be appreciated that the internal wall of the waveguide may have any suitable shape. As discussed above, the internal wall of the waveguide may exhibit a substantially quadratic surface curvature. In some cases, a cross-section of the wall of the waveguide may be defined by a polynomial function of second degree, third degree, fourth degree, etc. Or, the wall may be irregularly shaped, where cross-sections of the wall are not defined according to a polynomial function. For instance, while not shown in the figures, the angle that the wall makes with respect to the horizontal y-axis may increase and/or decrease along the length of the waveguide such that the waveguide exhibits an hourglass-type shape, or the entrance of the waveguide may flare outward, or the waveguide may exhibit a bulge between the sample holder and the entrance.

In some embodiments, at least a portion of the focal zone is located approximately where the sample and sample holder are located, opposite the entrance of the waveguide. The focal zone may extend to any suitable region inside or outside the waveguide. In some cases, the focal zone of acoustic energy and/or a portion of the vessel may be located at least partially within an internal volume of the waveguide. Alternatively, the focal zone of acoustic energy and/or a portion of the vessel may be located at least partially outside of an internal volume of the waveguide. In some embodiments, the focal zone of acoustic energy may be located predominantly outside of the internal volume of the waveguide, as discussed further below. For example, greater than 50%, greater than 60%, greater than 70%, greater than 80%, or greater than 90% of the focal zone may lie outside the internal volume of the wave guide.

The focal zone of acoustic energy may exhibit a suitable peak pressure. The peak pressure of the focal zone may be influenced by a number of parameters, including the radiated acoustic power from the surface of the transducer, the size of the transducer, the operating frequency of the transducer, shape of the waveguide, etc. In an example, the transducer has an active area, from which acoustic energy is emitted, having a 25 mm diameter, and is operated at approximately 500 kHz central frequency. The parabolic waveguide provides a gain in surface pressure at the focal zone of about 10-12 times, where a substantial portion of the focal zone is located outside of the waveguide. In some embodiments, the peak pressure of the focal zone may be between 1 Pa and 100 Pa, between 2 Pa and 50 Pa, or between 5 Pa and 20 Pa.

The point of peak pressure of the focal zone may be located at any suitable location. In some embodiments, the point of peak pressure of the focal zone is located at or near the axis $Y_2$ defining the end of the waveguide where the sample is situated, opposite the entrance. The point of peak pressure of the focal zone may be formed at an appropriate location along the axis Z, for example, when the waveguide exhibits a symmetric shape.

In some embodiments, the point of peak pressure of the focal zone may be located at the intersection between the axes Z and $Y_2$. Alternatively, the point of peak pressure of the focal zone may be located along the axis Z at a point offset from the axis $Y_2$. For example, the point of peak pressure of the focal zone may be located at an appropriate distance (e.g., 5-20 mm, 10 mm, etc.) along the axis Z outside of the internal volume 22 defined by the waveguide 20. Or, the point of peak pressure of the focal zone may be located in the opposite direction at an appropriate distance along the axis Z within the internal volume 22 defined by the waveguide 20.

In some embodiments, it may be preferable for the focal zone to be located substantially outside of the waveguide. In some cases, when the focal zone is created outside of the waveguide, the potential for cavitation to occur within the internal volume defined by the waveguide is reduced.

The position and shape of the focal zone may vary depending on a number of factors, such as the particular configuration of the waveguide, the shape of the internal wall of the waveguide, the degree of acoustic reflectivity of the internal wall of the waveguide, the manner in which the acoustic transducer is oriented with respect to the waveguide (e.g., acoustic transducer oriented straight or at an angle relative to the waveguide), various parameters under which the acoustic energy is emitted (e.g., parameters of acoustic emission), independently or in combination.

The acoustic transducer may be operated according to an appropriate combination of parameters.

In some embodiments, acoustic energy is emitted at a peak incident power of between 25-150 W, between 50-100 W, or at a peak incident power that falls outside of the above ranges.

In some embodiments, suitable acoustic energy emitted may have a duty factor of between 5-50%, between 10-40%, between 15-30%, or a different duty factor.

In some embodiments, acoustic energy emitted may exhibit between 200-2000 cycles per burst, 500-1500 cycles per burst, 750-1250 cycles per burst, or another value of cycles per burst outside of the above noted ranges.

For example, the acoustic transducer may be operated at a frequency of approximately 500 kHz, a peak incident power of approximately 75 W, a duty factor of approximately 20%, cycles per burst of approximately 1000. It can be appreciated that other combinations of acoustic energy parameters may be possible for embodiments of the present disclosure.

Figure 4:
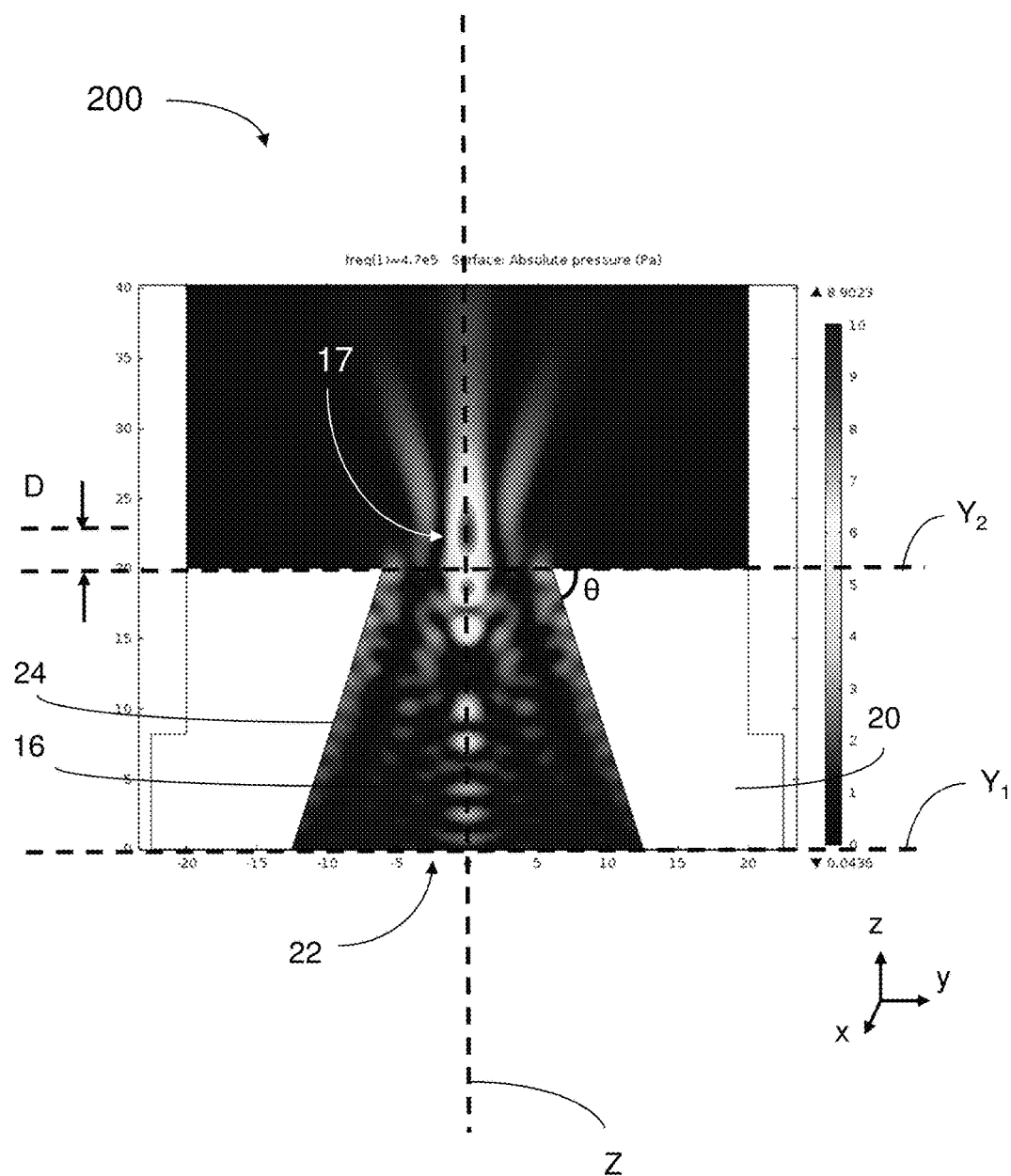
FIG. 4 shows a simulated pressure mapping of an acoustic treatment apparatus in operation in accordance with some embodiments.
Figure 5:
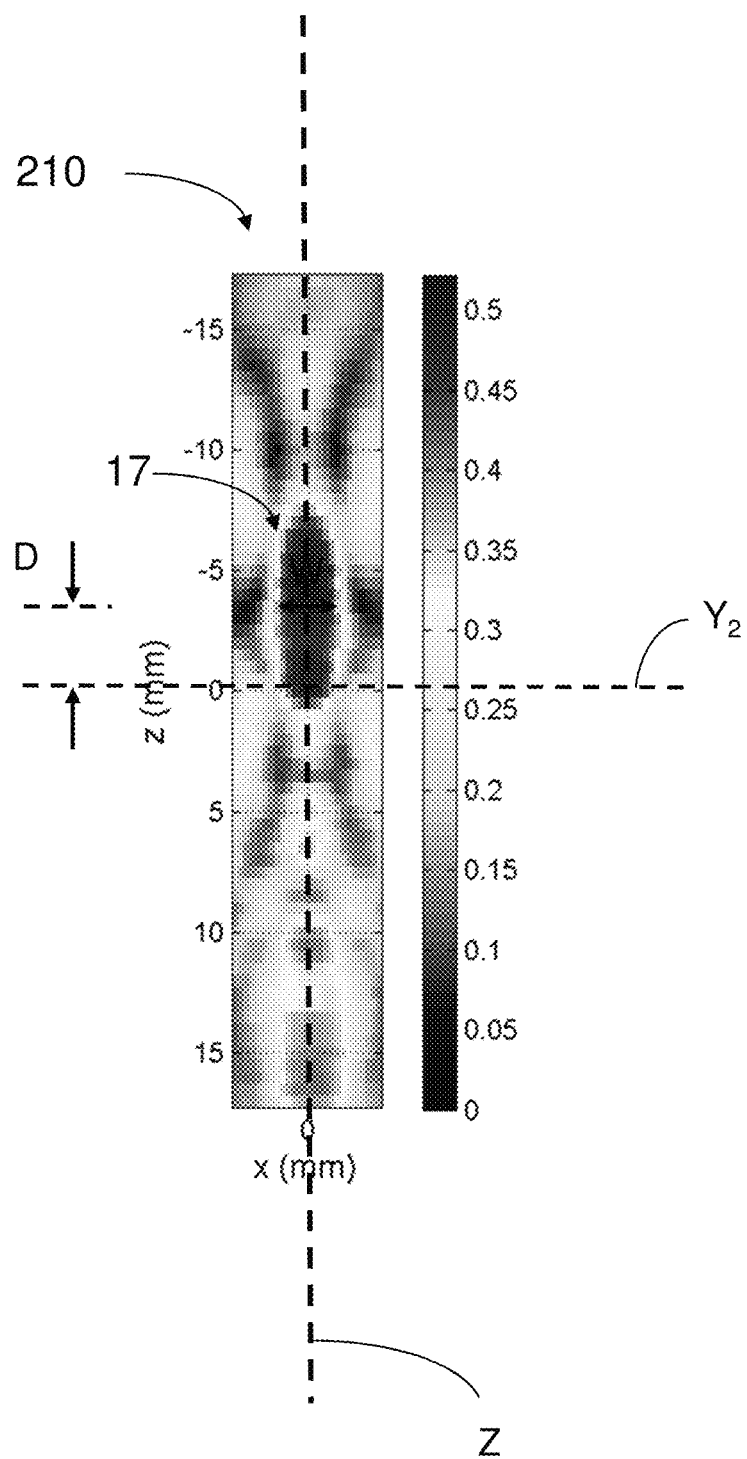
FIG. 5 depicts a simulated pressure mapping of a location of an acoustic treatment apparatus in operation in accordance with some embodiments.

FIGS. 4 and 5 depict a pressure mapping of a cross-section of an acoustic treatment apparatus in operation, in accordance with the embodiment illustrated in FIG. 2, where the wall 24 of the waveguide is tapered substantially linearly so as to define a conical internal volume within the waveguide.

As shown in FIG. 4, the wall 24 is symmetric about the reference axis Z such that the angle θ the wall makes with both reference axes $Y_1$, $Y_2$ is substantially constant along the length of the waveguide. As described further below, the waveguide having a linearly tapered wall causes the acoustic energy to converge into a focal zone 17 located at, and just beyond, the exit of the waveguide, where the sample and sample holder are generally located. Though, as further shown in FIG. 4, the pressure distribution of the fluid (coupling medium 16) within the waveguide during operation is indicative of turbulent fluid flow.

FIG. 5 depicts a magnified view of the pressure distribution at the exit of the waveguide, as shown by reference axis $Y_2$, providing further information regarding the location and shape of the focal zone 17.

FIG. 5 depicts the center of the focal zone 17, which is determined as the location of maximum peak pressure of the focal zone, located substantially outside of the internal volume defined by the waveguide along the reference axis Z. The center of the focal zone is spaced at a distance D from the reference axis $Y_2$. In the example of FIG. 5, the distance D of the center of the focal zone 17 from the reference axis $Y_2$ is approximately 4 mm; though, it should be appreciated that the center of the focal zone 17 may be located any suitable distance D from the exit of the waveguide (e.g., 1-15 mm, 2-10 mm, 2-5 mm, etc.).

FIG. 5 also provides information regarding the approximate width W of the focal zone 17, in accordance with some embodiments. Here, the focal zone 17 is shown to have a substantially ellipsoidal shape. It is noted that a focal zone of acoustic energy for embodiments of the present disclosure may have any suitable shape; though, for cases where the focal zone has a generally ellipsoid, spheroid, or similar shape, the width W of the focal zone, as discussed herein, is approximated as the minor axis of the shape where pressure is at a maximum. As shown, in FIG. 5, the width W of the focal zone 17 is approximately 2 mm; though, it should be appreciated that the focal zone 17 may have any suitable width W (e.g., 0.1-10 mm, 0.5-5 mm, 1-3 mm, etc.).

Figure 6:
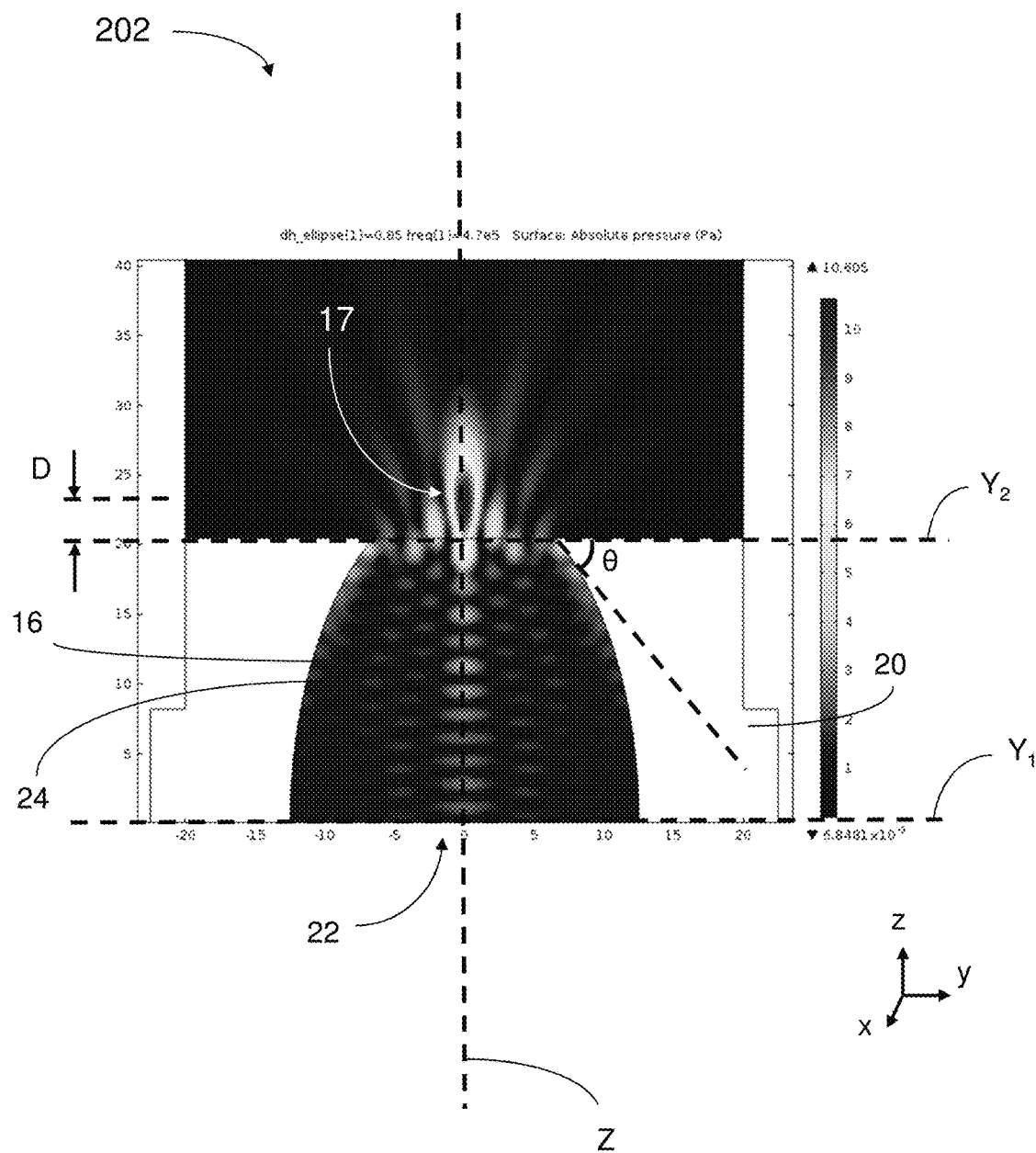
FIG. 6 shows a pressure mapping of another acoustic treatment apparatus in operation in accordance with some embodiments.
Figure 7:
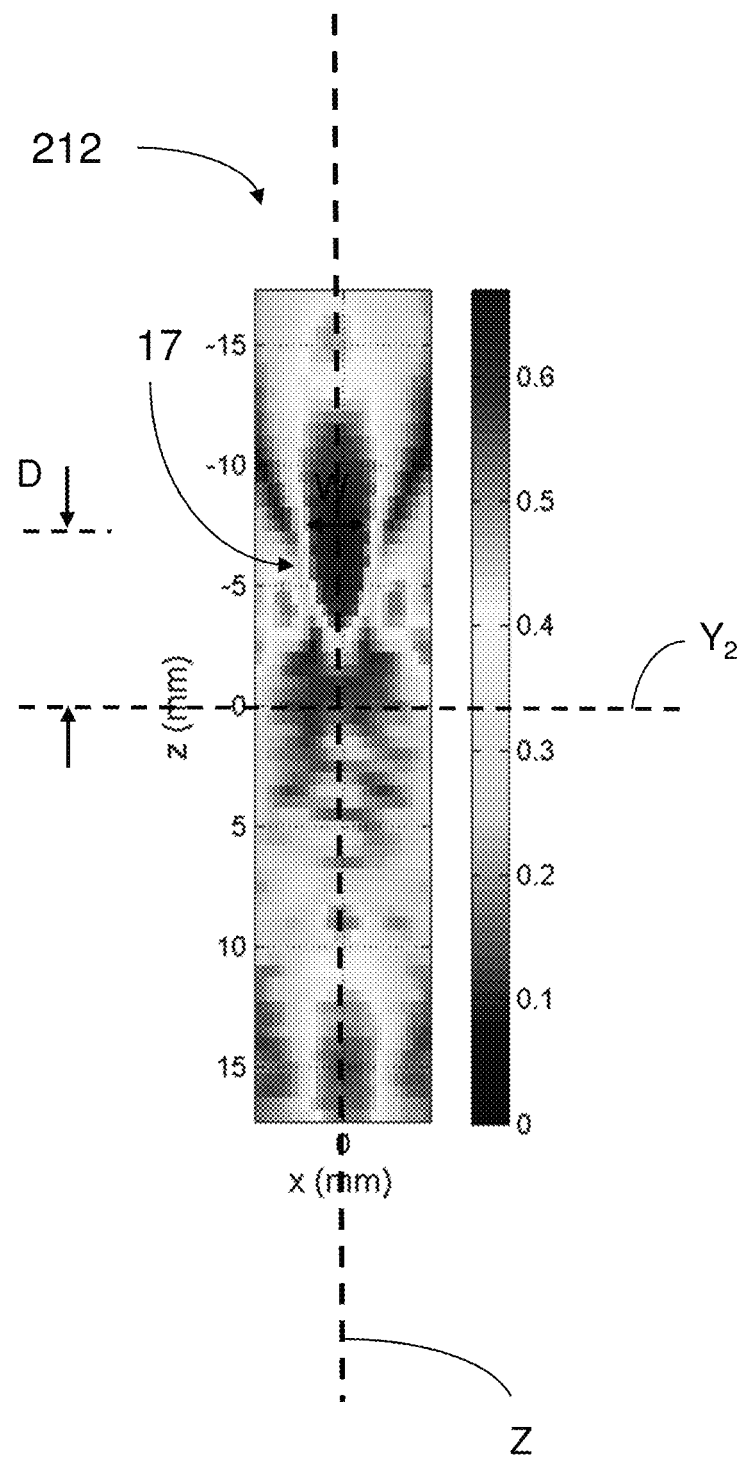
FIG. 7 depicts a simulated pressure mapping of a location of another acoustic treatment apparatus in operation in accordance with some embodiments.

FIGS. 6 and 7 depict pressure mapping of a cross-section of an acoustic treatment apparatus in operation, in accordance with the embodiment illustrated in FIG. 3. In contrast to the embodiments of FIGS. 2, 4 and 5, the wall 24 of the waveguide is tapered such that the wall of the waveguide exhibits a substantially parabolic shape.

As shown in FIG. 6, the wall 24 is symmetric about the reference axis Z. Further, the angle θ the wall makes with the horizontal, at reference axis $Y_2$, is greater than the angle that the wall makes with the horizontal closer to the entrance of the waveguide, at reference axis $Y_1$. That is, the angle θ the wall makes with the horizontal gradually increases moving from the reference axis $Y_2$ towards the reference axis $Y_1$. And as described further below, during operation, the pressure distribution of the fluid (coupling medium 16) within the internal volume of the parabolic waveguide is indicative of a reduced degree of turbulent behavior as compared with the pressure distribution of fluid within the internal volume of the conical waveguide, for example, shown in FIG. 4.

FIG. 7 illustrates a magnified view of the pressure distribution at the exit of the waveguide, as shown by reference axis $Y_2$, providing further information regarding the location and shape of the focal zone 17.

FIG. 7 depicts the center of the focal zone 17 to be located outside of the internal volume defined by the waveguide along the reference axis Z, spaced at a distance D from the reference axis $Y_2$. In the example of FIG. 7, the distance D from the reference axis $Y_2$ is comparatively greater than the respective distance D shown in the example of FIG. 5. In FIG. 7, the distance D of the center of the focal zone 17 from the reference axis $Y_2$ is approximately 7 mm; though, as discussed herein, the distance D for embodiments in accordance with the present disclosure is not so limited. For example, the distance D of the center of the focal zone from a reference axis $Y_2$ may be between 1-20 mm, 2-15 mm, 5-10 mm, or may fall outside of these ranges.

FIG. 7 also provides information regarding the approximate width W of the focal zone 17. In this example, the focal zone has an ellipsoidal shape that is oblong; thus, the width W of the focal zone, is approximated at a minor axis of the shape where pressure of the focal zone is greatest. The width W of the focal zone 17 of FIG. 7 is approximately 2 mm, though, it can be appreciated that the focal zone 17 may have any suitable width W, for example, between 0.1-10 mm, 0.5-5 mm, 1-3 mm, etc.

FIGS. 4 and 6 show, for respective embodiments, the pressure distribution of the fluid located inside and outside of the waveguide (sample holder not shown) upon entry of an acoustic energy wave into the waveguide, where the acoustic energy is generated from an acoustic transducer having a substantially flat surface. As discussed herein, acoustic energy emitted from a transducer having such a construction would not converge without assistance from an acoustic lens or waveguide-type structure that is configured to focus the acoustic energy. Though, the tapered surface of the waveguide wall causes the otherwise unfocused, non-convergent acoustic energy to converge into a focal zone 17, as indicated by the elevated peak pressure located near the exit of the waveguide, where the sample holder (not shown in FIGS. 4 and 6) is typically positioned.

As shown in each of FIGS. 4 and 6, the tapered surface of the waveguide also causes the formation of a spatially oscillating pressure distribution of fluid within the waveguide. The pressure distribution includes locally alternating peaks and valleys along the axis Z, provided along the wall 24, and therebetween. Though, as discussed below, the overall efficiency and, hence, effectiveness of acoustic treatment from employing the parabolic waveguide of FIG. 6 may be greater than that when employing the conical waveguide of FIG. 4.

For instance, the degree to which acoustic energy reflection off of the internal wall affects overall wave propagation within the waveguide for the example shown in FIG. 4 may be greater than that shown for the example of FIG. 6. As shown in FIG. 4, the pressure distribution of the fluid appears to be chaotic, having an irregular pattern that varies widely within the waveguide, particularly along directions parallel to the internal wall 24 (e.g., shown by pressure peaks having an irregular, or non-uniform, distribution). This amount and type of wave propagation shown in FIG. 4 is indicative of turbulent fluid flow within the waveguide, which is generally thought to be disruptive of overall acoustic wave propagation within the waveguide and its effects on sample processing.

Further, a conically shaped wall may cause a relatively strong reflection of the acoustic wave back toward the transducer, at times, affecting overall effectiveness of the acoustic treatment. For example, such back reflection of acoustic energy to the transducer may reduce the potential for resonance to occur in a favorable way within the system. Or, back reflection of acoustic energy to the transducer may interfere with acoustic wave propagation originating from the transducer. In some embodiments, a conically shaped wall may cause stronger reflection of the acoustic wave back toward the transducer as compared with, for example, a parabolically shaped wall.

In contrast, the pressure distribution of the fluid in the example illustrated by FIG. 6 appears to be generally uniform, or cohesive, in nature. That is, acoustic wave propagation through the internal volume of the waveguide does not appear as turbulent as that shown by the example of FIG. 4. While acoustic wave reflection may occur at the wall 24, the degree to which acoustic wave propagation is disrupted in the example of FIG. 6 may be less than that of the example of FIG. 4. Rather, the wall is effective in guiding the acoustic energy in a manner that creates an effective focal zone at a suitable location, where wave propagation is relatively uniform. Such uniform wave propagation, with minimal or reduced reflection, may result in efficient focused acoustic sample treatment. In some cases, the intensity of acoustic power applied to the system is significantly enhanced so as to improve overall acoustic treatment of the sample.

Acoustic wave disruption may limit overall cohesiveness and effectiveness of acoustic energy as it converges to form the focal zone 17. As a result, the peak pressure of the acoustic focal zone 17 is lower for the example of FIG. 4, as compared with the example of FIG. 6. Accordingly, to reach the same level of peak pressure within the focal zone, a transducer emitting acoustic energy into a substantially conical waveguide may require a greater amount of power input than if the same transducer were emitting acoustic energy into a waveguide having a parabolic shaped internal wall.

Further, unwanted construction of the acoustic wave within the waveguide may cause cavitation within the internal volume of the waveguide. While cavitation within the sample may, at times, be desirable, cavitation of coupling fluid or medium within the internal volume of the waveguide, which may randomly deflect acoustic energy, may give rise to inefficiencies in acoustic treatment.

Accordingly, it may be desirable for the center of the focal zone 17 to be located such that the focal zone is formed and remains substantially outside of the internal volume defined by the waveguide. For instance, in cases where it is desirable for cavitation (e.g., cavitation of coupling medium) within the waveguide to be reduced, or minimized, it is preferable for the focal zone to be located at a distance far enough from the waveguide such that the focal zone does not cause cavitation of coupling medium 16 within the waveguide.

As noted above, FIGS. 5 and 7 show, for respective embodiments during operation, a magnified pressure distribution of the fluid along the reference axis Z around the reference axis $Y_2$ at the exit of the waveguide. As discussed above, these views provide more detailed information regarding the location and shape of the focal zone 17 of acoustic energy.

While the focal zone shown in FIG. 7 appears to have an oblong ellipsoidal shape, the focal zone is located further away from the exit of the waveguide (further away from reference axis $Y_2$), as compared with the focal zone shown in FIG. 5. For instance, FIG. 5 shows the focal zone to be positioned such that a portion of the focal zone is located within the internal volume of the waveguide. Upon such an occurrence, one or more high pressure regions ("hot spots") may develop within the waveguide, giving rise to cavitation of the coupling medium within the internal volume of the waveguide.

It was found that, for some applications (e.g., protein extractions, chromatin shearing, nucleic acid processing, FFPE sample preparation, etc.), sample treatment using acoustic energy manipulated by a parabolically shaped waveguide is more effective (e.g., dissociating biological samples from paraffin, shearing/fragmenting nucleic acids, etc.) than if the same acoustic energy was manipulated by a conically shaped waveguide.

As discussed above, cavitation occurrence of coupling medium within the waveguide may give rise to inefficiencies within the acoustic treatment system. Where a focal zone that is formed by a conical waveguide (e.g., shown in FIGS. 2, 4, 5) may have up to 10%, up to 20%, or even 30% of the focal zone physically located within the internal volume of the waveguide, a focal zone formed by a parabolic waveguide (e.g., shown in FIGS. 3, 6, 7) may be substantially, or completely, outside of the internal volume of the waveguide.

As discussed above, the center of the focal zone 17 may be located any suitable distance D from exit of the waveguide, defined by the axis $Y_2$. In some embodiments, the center of the focal zone is located at a position such that the distance D of the center of the focal zone from exit of the waveguide is less than 15 mm, less than 10 mm, less than 5 mm, less than 4 mm, less than 3 mm, less than 2 mm, or less than 1 mm. Or, the center of the focal zone is located at a position such that the distance D from exit of the waveguide is greater than 1 mm, greater than 2 mm, greater than 3 mm, greater than 4 mm, greater than 5 mm, or greater than 10 mm. In some embodiments, the distance D may be approximately less than 150%, less than 100%, less than 80%, less than 60%, less than 40%, or less than 20% of the width (e.g., diameter) of the focal zone. Similarly, the distance D may be approximately greater than 20%, greater than 40%, greater than 60%, greater than 80%, greater than 100%, greater than 150% of the width (e.g., diameter) of the focal zone. The distance D may fall within any suitable range defined by any of the above upper and/or lower limits.

In some embodiments, in addition to, or in place of a waveguide, an acoustic lens may be provided between the acoustic transducer and the sample, so as to suitably cause convergence of the emitted acoustic energy at or near the sample. The acoustic lens may be constructed (e.g., have a convex or concave shape) such that an acoustic wave transmitted there through converges, resulting in the formation of an appropriate focal zone of acoustic energy. The acoustic lens may be located outside of or within the internal volume of the waveguide. Though, such an acoustic lens may be located at any suitable position.

An acoustic lens may sealingly close an opening in the waveguide, may be suitably transparent to, or may otherwise transmit acoustic energy so that the ultrasound beam is transmitted through the lens and is caused to converge so as to form a focal zone that affects the sample held within a sample holder. In some embodiments, the acoustic lens may be configured to transmit a significant amount of ultrasound energy to the sample, may minimize the absorption of ultrasound energy within the walls of the waveguide, and/or may assist in increasing the amount of heat transfer between the internal volume of the waveguide and, for example, an external water bath or other coupling medium.

In certain embodiments, the acoustic lens may be made up of glass, sapphire, quartz or a polymer such as a thin film polymer. The lens may have any suitable shape or other configuration, e.g., may be flat (or otherwise present a relatively flat surface to the impinging acoustic energy), or may be curved so as have a hemispherical or other convex shape. In certain embodiments, the acoustic lens is shaped to guide the sonic energy in a preferred manner relative to the internal volume, such as focusing or defocusing the acoustic energy, through a 'lense' effect caused by the physical shape of the lens (such as an effect caused by a concave or convex shape). In some embodiments, the lens has an acoustic impedance similar to that of water and a relatively low acoustic absorption. One preferred material is low density polyethylene, but other polymers such as polypropylene, polystyrene, poly(ethylene terephthalate) ("PET"), polyimide, and other rigid and flexible polymers may be used. If the lens is formed from a thin film material, the film may be a laminate to facilitate thermal bonding to the waveguide. For example, the acoustic lens may be sealingly attached to the waveguide using heat sealing. Thicker, more rigid materials may also be employed for an acoustic lens.

Aspects of the present disclosure may be used in conjunction with systems and methods for scaling a process utilizing focused acoustical energy to larger volume batch and continuous process flows, such that the desired result of acoustic treatment can be achieved on larger sample volumes. The desired result of acoustic treatment, which may be achieved or enhanced by use of ultrasonic wavetrains, can be, without limitation, heating the sample, cooling the sample, fluidizing the sample, micronizing the sample, mixing the sample, stirring the sample, disrupting the sample, permeabilizing a component of the sample, forming a nanoemulsion or nano formulation, enhancing a reaction in the sample, solubilizing, sterilizing the sample, lysing, extracting, comminuting, catalyzing, and/or selectively degrading at least a portion of a sample. Sonic waves may also enhance filtration, fluid flow in conduits, and fluidization of suspensions. Processes in accordance with the present disclosure may be synthetic, analytic, or simply facilitative of other processes such as stirring.

In certain embodiments, the sonic energy source may include, for example, an ultrasound transducer or other transducer, that produces acoustic waves in the "ultrasonic" frequency range. Ultrasonic waves start at frequencies above those that are audible, typically about 20,000 Hz or 20 kHz, and continue into the region of megahertz (MHz) waves. The speed of sound in water is about 1000 meters per second, and hence the wavelength of a 1000 Hz wave in water is about a meter, typically too long for specific focusing on individual areas less than one centimeter in diameter, although usable in non-focused field situations. At 20 kHz the wavelength is about 5 cm, which is effective in relatively small treatment vessels. Depending on the sample and vessel volume, preferred frequencies may be higher, for example, about 100 kHz, about 1 MHz, or about 10 MHz, with wavelengths, respectively, of approximately 1.0, 0.1, and 0.01 cm. In contrast, for conventional sonication, including sonic welding, frequencies are typically approximately in the tens of kHz, and for imaging, frequencies are more typically about 1 MHz and up to about 20 MHz. In lithotripsy, repetition rates of pulses are fairly slow, being measured in the hertz range, but the sharpness of the pulses generated give an effective pulse wavelength, or in this case, pulse rise time, with frequency content up to about 100 to about 300 MHz, or 0.1-0.3 gigahertz (GHz).

The frequency used in certain embodiments of the present disclosure also will be influenced by the energy absorption characteristics of the sample or of the waveguide or chamber, for a particular frequency. To the extent that a particular frequency is better absorbed or preferentially absorbed by the sample material, it may be preferred. The energy can be delivered in the form of short pulses or as a continuous field for a defined length of time. The pulses can be bundled or regularly spaced.

A generally vertically oriented focused ultrasound beam may be generated in several ways by the acoustic energy source. For example, a single-element piezoelectric transducer, such as those supplied by Sonic Concepts, Woodinville, Wash., that can be a 1.1 MHz focused single-element transducer, can have a spherical or other curved transmitting surface that is oriented such that the focal axis is vertical. Another embodiment uses a flat transducer that emits generally non-convergent acoustic energy (i.e., acoustic energy that does not converge without outside influence), and an acoustic lens or suitable waveguide to focus the beam, as discussed above. Still another embodiment uses a multi-element transducer such as an annular array in conjunction with focusing electronics to create the focused beam. The annular array potentially can reduce acoustic sidelobes near the focal point by electronic apodizing, that is, by reducing the acoustic energy intensity, either electronically or mechanically, at the periphery of the transducer. This result can be achieved mechanically by partially blocking the sound around the edges of a transducer or by reducing the power to the outside elements of a multi-element transducer. This reduces sidelobes near the energy focus, and can be useful to reduce heating of the chamber or waveguide. Alternatively, an array of small transducers can be synchronized to create a converging beam. Still another embodiment combines a transducer that emits non-convergent acoustic energy, with a focusing acoustic minor to create the focused beam. This embodiment can be advantageous at lower frequencies when the wavelengths are large relative to the size of the transducer. The axis of the transducer of this embodiment may, for example, be horizontal and a shaped acoustic minor may be used to reflect the acoustic energy vertically and focus the energy into a converging beam.

In certain embodiments, the focal zone can be small relative to the dimensions of the treatment chamber or waveguide to avoid overheating of the treatment chamber/waveguide. In some embodiments, the focal zone has a width of approximately 1 mm. Heating of the treatment chamber can be reduced by minimizing acoustic sidelobes near the focal zone. Sidelobes are regions of high acoustic intensity around the focal point formed by constructive interference of consecutive wavefronts. The sidelobes can be reduced by apodizing the transducer either electronically, by operating the outer elements of a multi-element transducer at a lower power, or mechanically, by partially blocking the acoustic waves around the periphery of a single element transducer. Sidelobes may also be reduced by using short bursts, for example in the range of about 3 to about 5 cycles in the treatment protocol.

The transducer can be formed of a piezoelectric material, such as a piezoelectric ceramic. In some embodiments, the ceramic may be fabricated as a "dome," which tends to focus the energy. However, a "dome" or curved shape arrangement is not necessary, as provided in embodiments of the present disclosure; for example, the transducer may have a flat shape from which acoustic energy is emitted. One application of such materials is in sound reproduction; however, as used herein, the frequency is generally much higher and the piezoelectric material would be typically overdriven, that is driven by a voltage beyond the linear region of mechanical response to voltage change, to sharpen the pulses. Typically, some domes have a longer focal length than that found in lithotriptic systems, for example, about 20 cm versus about 10 cm focal length. Ceramic domes can be damped to prevent ringing. The response is linear if not overdriven. The high-energy focus zone of one of these domes is typically cigar-shaped. At 1 MHz, the focal zone is about 6 cm long and about 2 cm wide for a 20 cm dome, or about 15 mm long and about 3 mm wide for a 10 cm dome. The peak positive pressure obtained from such systems may be about 1 MPa (mega Pascal) to about 10 MPa pressure, or about 150 PSI (pounds per square inch) to about 1500 PSI, depending on the driving voltage. A boundary of the focal zone may be determined where the acoustic intensity is within about 6 dB of the peak acoustic intensity, formed around a geometric focal point.

The wavelength, or characteristic rise time multiplied by sound velocity for a shock wave, is in the same general size range as a biological cell, for example about 10 to about 40 microns. This effective wavelength can be varied by selection of the pulse time and amplitude, by the degree of focusing maintained through the interfaces between the source and the material to be treated, and the like.

Another source of focused acoustic pressure waves is an electromagnetic transducer and a parabolic concentrator, as is used in lithotripsy. The excitation of such devices tends to be more energetic, with similar or larger focal regions. Strong focal peak negative pressures of about −16 MPa have been observed. Peak negative pressures of this magnitude provide a source of cavitation bubbles in water, which can be desirable in an extraction process.

One treatment protocol for treating material with acoustic energy can include variable acoustic waveforms, produced from a transducer and waveguide arrangement, combined with sample motion and positioning to achieve a desired effect. The acoustic waveform of the energy resulting from the transducer and waveguide combination may have many effects, including: acoustic microstreaming in and near cells due to cavitation, that is flow induced by, for example, collapse of cavitation bubbles; shock waves due to nonlinear characteristics of the fluid bath; shock waves due to cavitation bubbles; thermal effects, which lead to heating of the sample, heating of the sample vessel, and/or convective heat transfer due to acoustic streaming; flow effects, causing deflection of sample material from the focal zone due to shear and acoustic pressure, as well as mixing due to acoustic streaming, that is flow induced by acoustic pressure; and chemical effects. The waveform of focused sound waves can be a single shock wave pulse, a series of individual shock wave pulses, a series of shock wave bursts of several cycles each, or a continuous waveform. Incident waveforms can be focused directly by either a single element, such as a focused ceramic piezoelectric ultrasonic transducer, or by an array of elements with their paths converging to a focus. Alternatively, multiple foci can be produced to provide ultrasonic treatment to multiple treatment zones, vessels, or wells. Additionally, the flow of the sample material into, or out of the processing chamber/waveguide can interact with the acoustic effects, and the acoustic streaming can be modified to enhance this sample flow in a desirable manner.

The treatment protocol can be optimized to maximize energy transfer while minimizing thermal and flow effects. The treatment protocol also can effectively mix the contents within the sample holder, in the case of a particulate sample suspended in a liquid. Energy transfer into the sample can be controlled by adjusting the parameters of the acoustic wave such as frequency, amplitude, and cycles per burst. Temperature rise in the sample can be controlled by limiting the duty cycle of the treatment and by optimizing heat transfer between the waveguide or sample holder and the coupling medium. Heat transfer can be enhanced by making the waveguide or sample holder with thin walls, of a relatively highly thermally conductive material, and/or by promoting forced convection by acoustic streaming in the waveguide and in the fluid bath. Additionally, the waveguide and/or sample holder can be modified to enhance the thermal coupling between the sample and the exterior environment by providing enhanced surface treatments such as increased area, for example, with fins, an actively pumped water jacket, and/or high conductivity vessel materials.

Control of the acoustic energy source may be performed by a system control unit using a feedback control mechanism so that any of accuracy, reproducibility, speed of processing, control of temperature, provision of uniformity of exposure to sonic pulses, sensing of degree of completion of processing, monitoring of cavitation, and control of beam properties (including intensity, frequency, degree of focusing, wave train pattern, and position), can enhance performance of the treatment system. A variety of sensors or sensed properties may be used by the controller for providing input for feedback control. These properties can include sensing of temperature of the sample material; sonic beam intensity; pressure; coupling medium properties including temperature, salinity, and polarity; sample material position; conductivity, impedance, inductance, and/or the magnetic equivalents of these properties, and optical or visual properties of the sample material. These optical properties, which may be detected by a sensor typically in the visible, IR, and UV ranges, may include apparent color, emission, absorption, fluorescence, phosphorescence, scattering, particle size, laser/Doppler fluid and particle velocities, and effective viscosity. Sample integrity and/or comminution can be sensed with a pattern analysis of an optical signal from the sensor. Particle size, solubility level, physical uniformity and the form of particles could all be measured using instrumentation either fully stand alone sampling of the fluid and providing a feedback signal, or integrated directly with the focused acoustical system via measurement interface points such as an optical window. Any sensed property or combination thereof can serve as input into a control system. The feedback can be used to control any output of the system, for example beam properties, sample position or flow in the chamber, treatment duration, and losses of energy at boundaries and in transit via reflection, dispersion, diffraction, absorption, dephasing and detuning.

According to certain embodiments of the present disclosure, several aspects of the treatment system can enhance the reproducibility and/or effectiveness of particular treatments using ultrasonic energy in in vitro applications, where reproducibility, uniformity, and precise control are desired. These aspects include the use of feedback, precise focusing of the ultrasonic energy, monitoring and regulating of the acoustic waveform (including frequency, amplitude, duty cycle, and cycles per burst), positioning of the chamber/waveguide relative to the ultrasonic energy so that the sample material is uniformly treated, controlling movement or flow of the sample relative to the focus of ultrasonic energy during a processing step, and/or controlling the temperature of the sample being treated, either by the ultrasonic energy parameters or through the use of temperature control devices such as a water bath. A treatment protocol can be optimized, using one or a combination of the above variables, to maximize, for example, shearing, extraction, permeabilization, comminution, stirring, or other process steps, while minimizing undesirable thermal effects.

In one embodiment of the present disclosure, high intensity ultrasonic energy is focused within an internal volume of a chamber/waveguide, and "real time" feedback relating to one or more process variables is used to control the process. In another embodiment, the process is automated and is used in a high throughput system, such as a continuous flowing stream of material to be treated, optionally segmented.

Optical or video detection and analysis can be employed to optimize treatment of the sample. For example, in a suspension of biological tissue, the viscosity of the mixture can increase during treatment due to the diminution of the particles by the treatment and/or by the liberation of macromolecules into the solution. Video analysis of the sample during treatment allows an automated assessment of the mixing caused by the treatment protocol. The protocol may be modified during the treatment to promote greater mixing or processing as a result of this assessment. The video data may be acquired and analyzed by the computer control system (i.e., part of the controller) that is controlling the treatment process. Other optical measurements such as spectral excitation, absorption, fluorescence, emission, and spectral analysis also can be used to monitor treatment of the sample, whether in a chamber or in a flow path upstream or downstream of the chamber. A laser beam, for example, can be used for alignment and to indicate current sample position. In certain embodiments the visual or optical detection can be performed through a window in the chamber/waveguide. This window can be the upper or lower window of the chamber/waveguide, a visual window integrated into the vessel side itself, or can be a window integrated into the transfer tubing or sample reservoir.

Certain applications require that the temperature of the sample being processed be managed and controlled during processing. For example, many biological samples should not be heated above 4 degrees C. during treatment. Other applications require that the samples be maintained at a certain elevated temperature during treatment. The ultrasound treatment protocol influences the sample temperature in several ways: the sample absorbs acoustic energy and converts it to heat; the sample treatment chamber absorbs acoustic energy and converts it to heat which, in turn, can heat the sample; and acoustic streaming develops within the sample treatment chamber and the coupling medium, forcing convective heat transfer between the sample treatment chamber and the coupling medium.

The acoustic waves or pulses can be used to regulate the temperature of the solutions in the treatment chamber. At low power, the acoustic energy produces a slow stirring without marked heating. Although energy is absorbed to induce the stirring, heat may be lost rapidly through the sides of the treatment chamber, resulting in a negligible equilibrium temperature increase in the sample. At higher energies, more energy is absorbed, and the temperature rises. The degree of rise per unit energy input can be influenced and/or controlled by several characteristics, including the degree of heat absorption by the sample or the treatment chamber and the rate of heat transfer from the treatment chamber to its surroundings (e.g., the coupling medium). Additionally, the treatment protocol may alternate a high-powered treatment interval, in which the desired effects are obtained, with a low power mixing interval, in which acoustic streaming and convection are achieved without significant heat generation. This convection may be used to promote efficient heat exchange or cooling.

The sample temperature may be required to remain within a given temperature range during a treatment procedure. Temperature can be monitored remotely by, for example, an infra-red sensor. Temperature probes such as thermocouples may not be particularly well suited for all applications because the sound beam may interact with the thermocouple and generate an artificially high temperature in the vicinity of the probe. Temperature can be monitored by the same computer that controls acoustic waveform. The control responds to an error signal which is the difference between the measured actual temperature of the sample and the target temperature of the sample. The control algorithm can be as a hysteritic bang-bang controller, such as those in kitchen stoves, where, as an output of the control system, the acoustic energy is turned off when the actual temperature exceeds a first target temperature and turned on when the actual temperature falls below a second target temperature that is lower than the first target temperature. More complicated controllers can be implemented. For example, rather than simply turning the acoustic signal on and off, the acoustic signal could continuously be modulated proportionally to the error signal, for example, by varying the amplitude or the duty cycle, to provide finer temperature regulation.

In the application of a bang-bang control algorithm for a multiple sample format, once a maximum temperature value has been exceeded and the sonic energy is turned off for a particular sample, an alternative to waiting for the sample to cool below a selected temperature before turning the sonic energy on again, is to move on to the next sample, or increase the flow rate of new sample material into the treatment chamber. Another alternative is to switch to a predefined "cooling" waveform which promotes convection without adding significant heat to a particular sample, and synchronizing this cycle with the introduction of new sample material to the chamber.

In some applications, it can be preferable to treat the sample with as much energy as possible without causing cavitation within the sample. This result can be achieved by suppressing cavitation. In some cases, cavitation within the sample can be suppressed by pressurizing the treatment chamber above ambient, often known as "overpressure," to the point at which no negative pressure develops during the rarefaction phase of the acoustic wave. This suppression of cavitation may be beneficial in applications such as cell transformation where the desired effect is to open cellular membranes while maintaining viable cells. In other applications it may be desirable to enhance cavitation within the sample. In these applications, a "negative" overpressure or vacuum can be applied to the region of the focal zone.

The control of cavitation in the sample also can be important during acoustic treatment processes. In some scenarios, the presence of small amounts of cavitation may be desirable to enhance biochemical processes; however, when large numbers of cavitation bubbles exist they can scatter sound before it reaches the target, effectively shielding the sample.

Though, in some cases, cavitation within the spaced defined by the waveguide, external to the sample holder, may lead to inefficiencies in acoustic sample treatment. For example, such cavitation may be disruptive to formation of the focal zone at a suitable location, or may lead to undesirable acoustic energy dissipation.

Cavitation can be detected by a variety of methods, including acoustic and optical methods. An example of acoustic detection is a passive cavitation detector (PCD) which includes an external transducer that detects acoustic emissions from cavitation bubbles. (That is, the PCD may be external to the chamber/waveguide, e.g., the PCD may be located in the coupling medium) The signal from the PCD can be filtered, for example using a peak detector followed by a low pass filter, and then input to a controlling computer as a measure of cavitation activity. The acoustic signal could be adjusted in ways similar to those described in the temperature control example to maintain cavitation activity at a desired level.

Control of sonic energy emission, sonic energy characteristics, and/or location of a target relative to sonic energy also can be used to pump and control the flow rate of liquids, especially in capillaries; enhance chemical reactions, such as enhancing second-order reaction rates; increase effective Reynolds number in fluid flow; and control the dispensing of semi-solid substances.

By focusing sonic energy and positioning it near a wall of a chamber or another discontinuity in a fluid path, many local differences in the distribution of materials within a sample and/or spatially-derived reaction barriers, particularly in reactive and flowing systems, can be reduced to the minimum delays required for microscopic diffusion. Put differently, enhanced mixing can be obtained in situations where imperfect mixing is common.

The controller may include any suitable components to perform desired control, communication and/or other functions as described above. For example, the controller may include one or more general purpose computers, a network of computers, one or more microprocessors, etc., for performing data processing functions, one or more memories for storing data and/or operating instructions (e.g., including volatile and/or non-volatile memories such as optical disks and disk drives, semiconductor memory, magnetic tape or disk memories, and so on), communication buses or other communication devices for wired or wireless communication (e.g., including various wires, switches, connectors, Ethernet communication devices, WLAN communication devices, and so on), software or other computer-executable instructions (e.g., including instructions for carrying out functions related to controlling the acoustic energy source, etc., as described above and other components), a power supply or other power source (such as a plug for mating with an electrical outlet, batteries, transformers, etc.), relays and/or other switching devices, mechanical linkages, one or more sensors or data input devices (such as a sensor to detect a temperature and/or presence of the material in a chamber/waveguide, a video camera or other imaging device to capture and analyze image information regarding the chamber/waveguide or other components, position sensors to indicate positions of the acoustic transducer and/or the sample holder, and so on), user data input devices (such as buttons, dials, knobs, a keyboard, a touch screen or other), information display devices (such as an LCD display, indicator lights, a printer, etc.), and/or other components for providing desired input/output and control functions.

While aspects of the invention have been described with reference to various illustrative embodiments, such aspects are not limited to the embodiments described. Thus, it is evident that many alternatives, modifications, and variations of the embodiments described will be apparent to those skilled in the art. Accordingly, embodiments as set forth herein are intended to be illustrative, not limiting. Various changes may be made without departing from the spirit of aspects of the invention.

The invention claimed is:

1. A system for providing acoustic treatment, comprising:
   an acoustic energy source configured to emit acoustic energy toward a vessel location; and
   a waveguide including a wall defining an internal volume and having a parabolic shape constructed and arranged to manipulate the acoustic energy to form a focal zone of acoustic energy at least partially within the internal volume to expose a sample in a vessel at the vessel location to focused acoustic energy at the focal zone, the wall extending from an entrance opening of the waveguide to an exit opening of the waveguide, the acoustic energy source being arranged to emit acoustic energy through the entrance opening and into the internal volume;
   a coupling medium within the internal volume and in contact with the acoustic energy source and arranged to transmit acoustic energy from the acoustic energy source and to the vessel location, the coupling medium being in contact with the wall of the waveguide; and
   a vessel for holding the sample to be treated at the vessel location such that a portion of the sample is exposed to acoustic energy at the focal zone, the vessel at the vessel location being received through the exit opening of the waveguide to be located at least partially within the internal volume of the waveguide and in contact with the coupling medium.

2. The system of claim 1, wherein the acoustic energy source is configured to emit non-convergent acoustic energy and the wall of the waveguide is constructed and arranged to manipulate the non-convergent acoustic energy to form the focal zone of acoustic energy at the vessel location.

3. The system of claim 2, wherein the acoustic energy source is configured to emit a substantially flat acoustic wave.

4. The system of claim 3, wherein the acoustic energy source includes a substantially flat surface from which the substantially flat acoustic wave is emitted.

5. The system of claim 1, wherein the wall of the waveguide is acoustically reflective.

6. The system of claim 1, wherein the wall of the waveguide is constructed and arranged to manipulate acoustic energy emitted thereon to form the focal zone of acoustic energy to be located at least partially within the internal volume of the waveguide.

7. The system of claim 1, wherein the wall of the waveguide is constructed and arranged to manipulate acoustic energy emitted thereon to form the focal zone of acoustic energy to be located at least partially outside of the internal volume of the waveguide.

8. The system of claim 7, wherein the wall of the waveguide is constructed and arranged to manipulate acoustic energy emitted thereon to form at least 50% of the focal zone of acoustic energy to be located outside of the internal volume of the waveguide.

9. The system of claim 1, wherein the wall defines a shape of the internal volume of the waveguide such that the shape of the internal volume tapers from the entrance opening of the waveguide toward the exit opening of the waveguide, the exit opening of the waveguide being closer to the vessel location than the entrance opening of the waveguide.

10. The system of claim 9, wherein the tapered shape of the internal volume of the waveguide is structured such that a cross-sectional area of the internal volume closer to the acoustic energy source is greater than a cross-sectional area of the internal volume farther away from the acoustic energy source.

11. The system of claim 9, wherein the tapered shape of the internal volume of the waveguide is structured such that an angle defined by the wall and a horizontal reference axis closer to the acoustic energy source is greater than an angle defined by the wall and the horizontal reference axis farther away from the acoustic energy source.

12. The system of claim 9, wherein the tapered shape of the internal volume of the waveguide exhibits a substantially quadratic surface curvature.

13. The system of claim 1, wherein the coupling medium is a liquid coupling medium.

14. The system of claim 1, wherein the focal zone of acoustic energy has a width of less than 2 cm.

15. A method of acoustic energy treatment, comprising:
providing a vessel holding a sample to be treated at a vessel location, the vessel being received through an exit opening of a waveguide such that a portion of the vessel is located at least partially within an internal volume of the waveguide and in contact with a coupling medium within the internal volume;
emitting acoustic energy from an acoustic energy source, which is in contact with the coupling medium, to the vessel at the vessel location via the coupling medium; and
manipulating the emitted acoustic energy by the waveguide including a wall having a parabolic shape to form a focal zone of acoustic energy located at least partially within the vessel and at least partially within the internal volume, the wall of the waveguide being in contact with the coupling medium and extending from an entrance opening to the exit opening.

16. The method of claim 15, wherein manipulating the emitted acoustic energy comprises forming the focal zone of acoustic energy to be located at least partially outside of the internal volume of the waveguide.

17. The method of claim 16, wherein manipulating the emitted acoustic energy comprises forming at least 50% of the focal zone of acoustic energy to be located outside of the internal volume of the waveguide.

18. The method of claim 15, wherein manipulating the emitted acoustic energy comprises forming the focal zone of acoustic energy to result in a peak pressure of between 5 Pa and 20 Pa.

19. The method of claim 15, wherein manipulating the emitted acoustic energy comprises causing convergence of the acoustic energy by reflecting the emitted acoustic energy from the wall of the waveguide.

20. The method of claim 15, wherein manipulating the emitted acoustic energy comprises causing substantially uniform propagation of the acoustic energy within the internal volume of the waveguide in a direction away from the acoustic energy source.

21. The method of claim 15, wherein manipulating the emitted acoustic energy comprises exposing a portion of the vessel holding a sample to the focal zone of acoustic energy.

22. The method of claim 15, wherein manipulating the emitted acoustic energy comprises forming the focal zone of acoustic energy to have a width of less than 2 cm.

23. The method of claim 15, wherein emitting acoustic energy comprises operating the acoustic energy source at a peak incident power of between 0 watts and 150 watts, a duty factor of between 0% and 40%, and a cycles per burst of between 0 and 1500.

24. The method of claim 15, wherein the focal zone of acoustic energy is sufficient to cause cavitation in a liquid sample in the vessel.

* * * * *

UNITED STATES PATENT AND TRADEMARK OFFICE
CERTIFICATE OF CORRECTION

| | | |
|---|---|---|
| PATENT NO. | : 9,786,266 B2 | Page 1 of 1 |
| APPLICATION NO. | : 14/101855 | |
| DATED | : October 10, 2017 | |
| INVENTOR(S) | : James A. Laugharn, Jr. et al. | |

It is certified that error appears in the above-identified patent and that said Letters Patent is hereby corrected as shown below:

In the Specification

At Column 16, Line 55, "minor" should be corrected to "mirror"

At Column 16, Line 60, "minor" should be corrected to "mirror"

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*